Dec. 22, 1953

C. T. GODDARD

2,663,819

ELECTRODE SUPPORT AND SPACING STRUCTURE
FOR ELECTRON DISCHARGE DEVICES

Filed June 15, 1951

INVENTOR
C. T. GODDARD
BY

ATTORNEY

Dec. 22, 1953     C. T. GODDARD     2,663,819
ELECTRODE SUPPORT AND SPACING STRUCTURE
FOR ELECTRON DISCHARGE DEVICES
Filed June 15, 1951     6 Sheets-Sheet 2

INVENTOR
C. T. GODDARD
BY
ATTORNEY

Dec. 22, 1953 C. T. GODDARD 2,663,819
ELECTRODE SUPPORT AND SPACING STRUCTURE
FOR ELECTRON DISCHARGE DEVICES
Filed June 15, 1951 6 Sheets-Sheet 3

INVENTOR
C. T. GODDARD
BY
ATTORNEY

Dec. 22, 1953   C. T. GODDARD   2,663,819
ELECTRODE SUPPORT AND SPACING STRUCTURE
FOR ELECTRON DISCHARGE DEVICES
Filed June 15, 1951   6 Sheets-Sheet 4

FIG. 5

INVENTOR
C. T. GODDARD
BY
ATTORNEY

Dec. 22, 1953             C. T. GODDARD            2,663,819
ELECTRODE SUPPORT AND SPACING STRUCTURE
FOR ELECTRON DISCHARGE DEVICES
Filed June 15, 1951            6 Sheets-Sheet 5

INVENTOR
C. T. GODDARD
BY
ATTORNEY

Dec. 22, 1953

C. T. GODDARD 2,663,819

ELECTRODE SUPPORT AND SPACING STRUCTURE
FOR ELECTRON DISCHARGE DEVICES

Filed June 15, 1951

INVENTOR
C. T. GODDARD
BY
ATTORNEY

Patented Dec. 22, 1953

2,663,819

UNITED STATES PATENT OFFICE 2,663,819

ELECTRODE SUPPORT AND SPACING STRUCTURE FOR ELECTRON DISCHARGE DEVICES

Charles T. Goddard, Basking Ridge, N. J., assignor to Bell Telephone Laboratories, Inc., New York, N. Y., a corporation of New York Application June 15, 1951, Serial No. 231,816

26 Claims. (Cl. 313—261)

This invention relates to electron discharge devices and more particularly to such devices having closely spaced electrodes.

In planar electron discharge devices having relatively large cathode emitting surfaces, it has been customary to position the electrodes by use of precision cut apertures in end insulators, such as micas. When the interelectrode spacings desired are of the order of 0.001 inch, the difficulties inherent in attempting to control the accuracy of the spacings by controlling the tolerances of the apertures in the insulators become very great. If the interelectrode spacings are to be kept even within a 10 per cent tolerance, a reproducible control of the spacing to one ten thousandth of an inch is required. Additionally, this precision of spacing must be maintained when the device is in operation and when, during processing, the cathode is heated to much higher than normal temperatures. Thus, buckling or bowing resulting from thermal expansion of the elements must be reduced to a minimum.

When the interelectrode spacing is maintained by end insulators, such as mica, critical dimension tolerances must be placed on the position and shape of the apertures in the mica. These dimensions are at best measured from the average of a macroscopically irregular edge, making difficult the attainment of a high degree of accuracy. Further, precision apertures are most readily obtained in very thin mica whose mechanical strength leaves much to be desired. The edges of these apertures are worn down by the elements extending therethrough, thereby altering even the original precision dimension of the aperture.

In order to attain a reproducible, very close interelectrode spacing, it is also necessary to specify a very small dimensional tolerance for variations of that spacing. Thus, the total cathode-control electrode spacing tolerance is a function of the sum of the tolerances of both of these elements and more particularly of the support and spacing means therefor. When each element is independently supported, as by end supports or insulators, the number of individual tolerances introduced and which go to make up the tolerance of the interelectrode spacing is considerably increased.

With these very close interelectrode spacings, problems arise when it is desired that the assembly of the electron discharge devices be accomplished without allowing the closely spaced electrodes to contact during the assembling. This is particularly of importance when the cathode is being positioned adjacent the control electrode as the spacing between the two is advantageously exceedingly small, as of the order of 0.001 inch or less, and the lateral wires which comprise the control electrode are very fine, as of the order of 0.0003 inch or less in diameter, and are therefore delicate and easily ruptured or otherwise damaged by the impact of other objects. It is therefore desirable to provide the close interelectrode spacing between the electrodes, and particularly between the cathode and control electrode, in a manner which allows a facile assembling of the electrodes with small danger of contacting of the electrodes during assembly and resultant damaging thereof.

However, having attained these very close spacings, it is desirable that the means employed for spacing the electrodes be able to maintain the accuracy of the spacings even though the device may be mishandled or employed in equipment subject to shock, physical impact, concussion, or severe vibration. Such is particularly true when such devices are employed in military equipment where ruggedness becomes of great importance. Therefore, in certain applications, it is desirable to attain very close spacings without sacrificing any of the ruggedness of the device and, in fact, to attain such spacings in a device that is particularly capable of withstanding severe physical operating conditions.

It is one object of this invention to attain close interelectrode spacings with a high degree of accuracy. More particularly, it is an object of this invention to reduce the total number of individual tolerances in the device that are components of the overall tolerance of the interelectrode spacings.

It is a further object of this invention to attain such close spacings employing planar electrodes. The employement of large planar electrodes allows for a high current, a large emissive surface area cathode, and a large anode, capable of dissipating a relatively large amount of power. Thus, it is an object of this invention to achieve close interelectrode spacings with large electrodes and correspondingly large supporting members. It will be apparent, however, that the methods disclosed are adaptable to planar electrodes of any convenient size, whether large or small.

It is a still further object of this invention to reduce the variations in interelectrode spacings. Such variations may arise either during the processing of the device or during its subsequent operation and life. It is therefore an object of this invention to reduce to a minimum variations in the close interelectrode spacings due to expanding, warping, bowing, or other thermally induced changes in the dimensions, and due to the supports or spacers for the electrodes and other elements.

It is a still further object of this invention to simplify the manufacture of electron discharge devices and particularly such devices having closely spaced electrodes. Thus, it is an object of this invention to enable the assembling of electron discharge devices without damaging contact of active surfaces during the assembling. It is also an object of this invention to simplify the manufacture of such devices by permitting the facile inspection of the electrodes and other component elements both during and after such assembly.

It is a still further object of this invention to prevent variations in the positioning of the electrodes of a device and in the interelectrode spacings by physical impact. Thus, it is an object of this invention to afford a very rugged structure capable of withstanding mishandling, physical impact, shock, or vibration without causing variations in the positioning of the electrodes or in the interelectrode spacings.

These and other objects of this invention are achieved in accordance with this invention by reducing the number of critical tolerances in each part to a minimum in combination with the elimination of additive tolerances in non-essential parts, all of which are required to determine the interelectrode spacings, together with other elements of this invention. Thus, in accordance with this invention, precision end insulators, or micas, are eliminated as spacing means, and that function is transferred to a stepped portion which cooperates with the electrodes to determine their spacing. This stepped portion is located between the electrodes and in one specific embodiment of this invention is in the control electrode side rods and positions a short insulating spacer rod or pin against which both the cathode and anode rest.

Further, in accordance with this invention, the electrodes are spring biased against the spaced rod, thus accurately positioning them and maintaining the elements in proper position. Each active element of the device is spring loaded so as to be positioned with respect to one of its reference faces or planes. Thus, in accordance with one feature of this invention, the cathode is positioned and supported by its coated surface.

In one specific illustrative embodiment of this invention, the control electrode comprises a frame of two side rods and two back end rods, the side rods having a stepped portion at their ends against which an insulating spacer rod or pin is spring biased by the anode and the anode spring loading means. The cathode is a flat hollow rectangular member that fits into the control electrode between the side rods and between the end rods and the laterals across the side rods and is spring biased against the spaced rod or pin by the cathode spring loading means. In this specific illustrative embodiment, the control electrode side rods extend through end spacers which form a frame for the electrode assembly but are not positioned thereby, the interelectrode spacings being determined by the stepped portions and spacer pins against which the electrodes are spring biased.

In another specific illustrative embodiment of this invention, the screen grid of a tetrode is spring biased against the insulating spacer pin in place of the anode, which may be located by other means. Thus, in the specific embodiment disclosed, the anode is positioned by a frame rod extending between the two end insulators.

In other specific illustrative embodiments wherein a very rugged structure is attained, all of the electrodes and cooperating elements are supported by a single mounting plate or member, being spring biased thereagainst and against each other. Thus, in one specific illustrative embodiment of this invention, the elements are all mounted in a cradle member and positioned with respect to the cradle member and to each other so that any but the most minute motion is impossible.

It is one feature of this invention that the spacing between the electrodes, and particularly the cathode to control electrode spacing, be determined by a stepped member determining reference planes and that the electrodes be spring biased towards these planes. More specifically, it is a feature of this invention that a reference step be provided in the side rods of the control electrode frame, against which stepped portion, a rod, pin, or other straight member is positioned, providing a reference plane towards which the cathode may be spring loaded.

It is a further feature of this invention that the electrodes be spring loaded or biased together in an electrode assembly or structure wherein each electrode is positioned with respect to only one of its reference faces or planes.

It is a further feature of this invention that the cathode of electron discharge devices be supported or positioned with reference to the other elements of the device by its coated surface.

It is a feature of certain specific illustrative embodiments of this invention that all of the elements of the device are supported by a single support member forming a compact unitary electrode assembly and more specifically that they are spring loaded towards each other in that assembly.

It is a further feature of one specific illustrative embodiment of this invention that all of the electrodes and elements are supported by a single support member and cooperate with each other so that possible movement of any element due to mishandling, impact, or vibration is a minimum. Specifically, in accordance with this feature of the invention, all of the elements are mounted by a cradle member and are spring loaded towards each other in the assembly formed thereby.

It is a further feature of certain specific illustrative embodiments of this invention that no welds need be employed in the assembling, positioning, and mounting of the elements, thereby eliminating a major source of failure in electron discharge devices subjected to rough handling and operating conditions.

It is a still further feature of this invention that free thermal expansion of the cathode, electrodes, and anode is permitted in a direction parallel to the cathode so that buckling cannot take place. Further, it is a feature of this invention that thermal expansion of the cathode, electrode frames, or anode perpendicular to the cathode surface will cause no change in the electrode spacings.

A complete understanding of this invention and of the various features thereof may be gained from consideration of the following detailed description and the accompanying drawing, in which.

Figure 1:
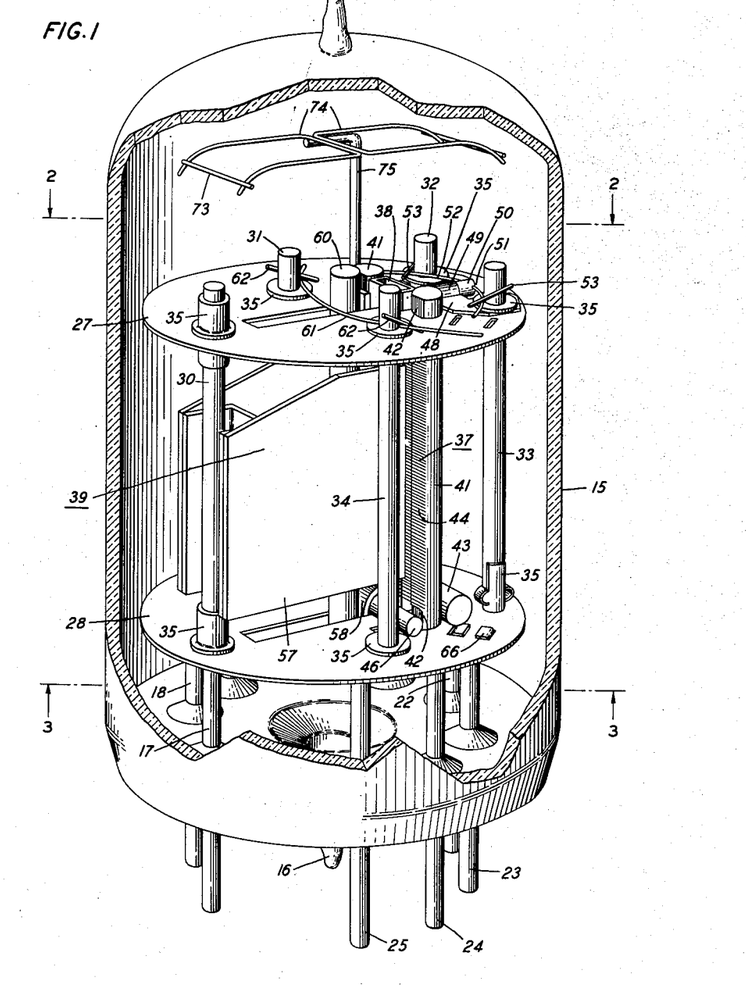
Fig. 1 is a perspective view of an electron discharge device illustrative of one specific embodiment of this invention, a portion of the envelope having been broken away.
Figure 2:
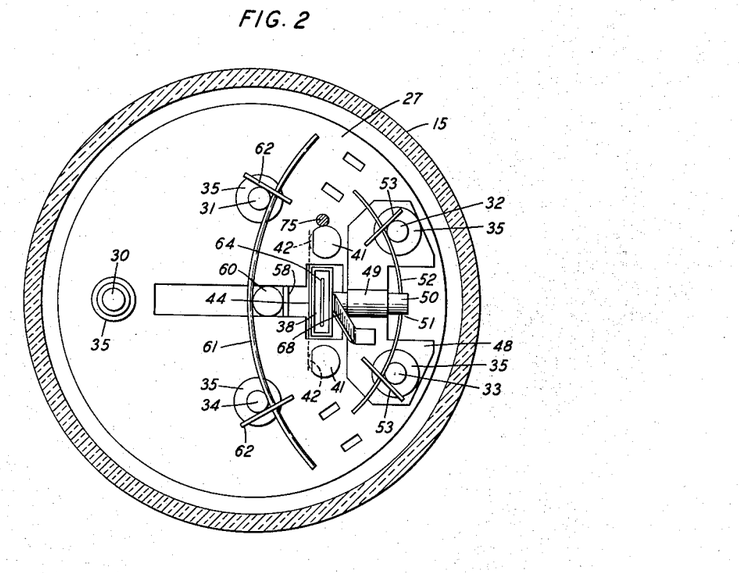
Fig. 2 is a plan view of the device of Fig. 1 taken along the line 2—2 thereof.

Referring now to the drawing, the illustrative embodiment of this invention shown in Fig. 1 comprises a bulb or envelope 15 having an exhaust tubulation 16 in its base and a plurality of lead-in wires 17, 18, 19, 20, 21, 22, 23, 24, and 25 extending through the base. An upper insulator member 27 and a lower insulator member 28, which may both be of mica, are positioned in the envelope 15. The lower insulator member 28 is supported on the inner ends of certain of the lead-in wires. Frame rods 30, 31, 32, 33, and 34, as of nickel, extend between the two insulator members 27 and 28 to which they are secured, as by eyelets 35. The insulator members and the frame rods define a frame within which the electrode members are located.

Within the frame thus defined are situated a control electrode 37, a cathode 38 to one side of the electrode 37, and an anode 39 to the other side of the electrode. The control electrode 37 comprises a pair of side rods 41, each having at each end a stepped portion 42, the purpose for which will be explained in detail further on, a pair of end rods 43 positioned between the side rods 41 and secured to the side rods opposite the stepped portions 42, and a plurality of lateral wires 44 extending across the side rods 41 between the stepped portions 42. The side rods 41 extend loosely through apertures in the insulators 27 and 28, the end rods 43 being against the inner surfaces of the insulators.

The cathode 38 is advantageously a flat hollow member having an electron emissive coating, as is known in the art, preferably only on the surface adjacent the control electrode lateral wires 44. The cathode is positioned between the electrode side rods 41 and also between the end rods 43 and the lateral wires 44 so as to be encompassed by the control electrode 37.

It is held in position by being spring biased against ceramic spacer rods or pins 46 positioned against the stepped portions 42. The spacer rods 46 are themselves spring biased against the stepped portions 42 of the electrode side rods 41, as explained in detail below.

The means biasing the cathode 38 against the spacer rods or pins 46 includes an end plate member 48 secured to the outer surfaces of each insulator member 27 and 28 by the eyelets 35 attached to the frame rods 32 and 33. The plate members 48 have a central curved channel 49 through which extends a short ceramic plunger 50 which has a notch 51 in one end removed from the cathode 38. Single wire springs 52 fit into each notch 51 and are bent so as to bear against the portions of the frame rods 32 and 33 nearest the cathode 38. Short wire members 53 attached to frame rods 32 and 33 prevent movement of the wire springs 53 along the rods 32 and 33. The inner end of each plunger 50 bears against one end of the cathode 38, thereby spring biasing the cathode against the spacer rod 46, which is itself spring biased against the stepped portion 42 of the electrode side rods 41.

The cathode 38 could also advantageously be biased against the spacer rods 46 by a single spring wire extending the length of the frame rods and flexed by a member secured between the two frame rods 32 and 33 about midway between the end insulator members 27 and 28.

Figure 4:
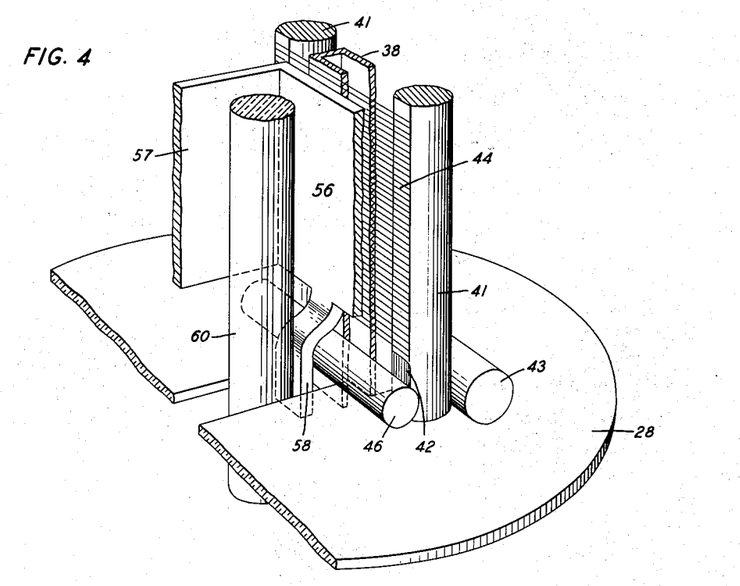
Fig. 4 is an enlarged perspective view of the lower portion of the control electrode and cooperating electrodes, showing particularly the stepped portions and the spacing of the electrodes by being spring loaded with respect to that stepped portion, portions of the elements being shown broken away for clarity.

The anode 39 advantageously comprises, in the particular illustrative embodiment of this invention shown in Fig. 1, a flat surface portion 56 opposite the lateral wires 44, as best seen in Fig. 4, integral long side portions 57, and a depending finger or tab 58, integral with the surface portion 56 and slightly displaced therefrom. The anode is spring biased against the spacer rods 46, thereby spring biasing the spacer rods 46 against the stepped portions 42 of the electrode side rods 41, by a ceramic anode loading rod 60 extending between the two insulator members 27 and 28 and bearing against the back of the depending fingers 58, the front of which bear against the spacer rods 46. A single wire spring 61 bears against the back of the anode loading rod 60 at each end, the springs 61 being flexed to bear against the portions of the frame rods 31 and 34 nearest the control electrode 37. Short wire members 62 are secured to frame rods 31 and 34 and prevent movement of the springs 61 therealong.

The attainment of very close and accurate spacings by spring biasing the elements against a single insulating member whose position is determined by an accurately determined step, in accordance with this invention, can be seen by reference to Fig. 4 which is an enlarged perspective of the electrode members and spacer adjacent the lower insulator 28, the various members being broken away for clarity and the stepped portion 42 being shown greatly enlarged. As is clearly seen in this figure, the ceramic rod 60 pressing on the anode portions 58 biases the ceramic rod 46 against the stepped portion 42. The cathode 38 is spring biased, as described above, against the other side of the spacer rods 46, so that the interelectrode spacing between the cathode 38 and the control electrode lateral wires 44 is the depth of the step 42, which can accurately be determined in a grinding operation.

Figure 3:
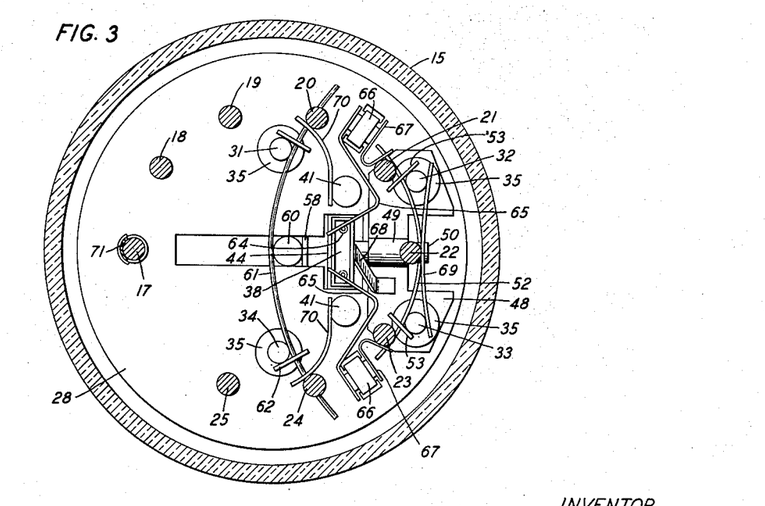
Fig. 3 is a sectional view of the device of Fig. 1 taken along the line 3—3 thereof.

Referring now to Fig. 3, a heater member 64 extends within the cathode 38, each end of the heater being attached by a strap or wire 65 to one side of a clip 66 secured to the lower insulator member 28. A strap 67 connects the other side of the clip 66 to lead-in wires 21 and 23, the clip serving to remove the heater straps from the vicinity of the cathode connections and thus minimize the danger of undesired electrical cross connections or short circuits. The cathode 38 is itself electrically connected to each end plate member 48 by a strap 68, the end plate members being in contact with the frame rods 32 and 33. A strap 69 extends between the frame rods 32 and 33 beneath the lower insulator member 28 and connects them to lead-in wire 22.

The control electrode is electrically connected to lead-in wires 20 and 24 by straps 70 extending from the side rods 41 beneath the lower insulator 28. The anode 39 is electrically connected to frame rod 30 which is secured by a short strap 71 to lead-in wire 17.

Getter wires 73 advantageously positioned adjacent the upper end of the bulb 15 by U-shaped wires 74 supported by a getter support wire 75, which may be secured to a portion of a control electrode side rod 41 above the upper insulator 27.

The side rods 41 and end rods 43 of the control electrode 37 may advantageously be four tungsten rods assembled in a frame as by welding or brazing. The side rods 41 are then advantageously surface ground or lapped along their upper surfaces to establish an electrode plane to which the laterals 44 can be secured. The four stepped portions 42 are then ground in the side rods 41, the depth of these steps accurately determining the control electrode to cathode spacing. The establishment of a flat winding plane and the depth of the steps with respect to that plane are the only critical dimensions involved in the fabrication of the control grid. The dimensions of the frame formed by the side and end rods, their lengths, and their diameters are all relatively unimportant. In the fabrication of the control electrode, a pair of these frames are advantageously wound back-to-back and then separated after gold brazing to provide electrodes for two devices as is known in the art.

The cathode 38 may advantageously be of rectangular nickel tubing, the width, thickness, and length of which are relatively unimportant in the attainment of the accurate close interelectrode spacing. It is, however, desirable that the coated face be flat and that the coating thereon be of accurate width, preferably thin.

The ceramic spacer rods 46 themselves need not be accurately machined to specified diameters or lengths or kept within close tolerances, as their lengths and diameters are secondary to the attainment of close interelectrode spacing in accordance with this invention. It is, however, advantageous that the spacer rods 46 be straight.

It is thus apparent that the number of tight tolerances for each part has been reduced to a minimum. The tolerances associated with the dimensions of the electrode and cathode themselves do not enter into the total control electrode-cathode spacing tolerance which is a function of the sum of tolerances associated just with the depth of the stepped portions 42 and the straightness of spacer rods 46. Both of these critical tolerances can be maintained easily within tight limits by present grinding and processing techniques. Further, the critical parts that are employed in this embodiment of this invention are relatively massive, particularly when compared to critical parts employed in prior close spaced electron discharge devices operable over the same frequency ranges. The insulators 27 and 28 and the apertures therein, the frame rods 30–34, the wire springs 52 and 61, and the other ceramic rods serve only to support and clamp the electrode assembly and provide insulation between the electrodes and thus play no part in determining the interelectrode spacings.

In the assembling of the illustrative embodiment of the invention shown in Fig. 1, the insulator spacers 27 and 28 are first assembled together with the frame rods 31, 32, 33, and 34, and the control electrode 37 in position between the two insulator assemblies. The spacer rods 46 are next placed in position adjacent the insulators 27 and 28 and resting on the precision steps 42 of the control electrode side rods 41. The anode 39 is then inserted between the two insulators with a simple rocking motion which causes the integral depending fingers or tabs 58 to project through slots in the insulators. The ceramic anode loading rod 60 is slid through the anode and the retaining spring wire 61 snapped into position on the outside of each insulator to spring load the anode and spacer rods 46 against the stepped portions 41 of the control electrode.

The cathode 38 is then inserted from one end of the structure with its coated side towards the grid laterals 44. It is desirable that the cathode thickness be considerably less than the diameter of the side rods 41 to afford sufficient clearance for the insertion of the cathode with little chance that the fine control electrode laterals 44 will be injured by contact with the cathode during this phase of the assembly. The structure is then rotated so that the cathode drops in place against the spacer rods 46. The two small plungers 50 are then dropped in place through the channels 49 so that their ends rest against the underside of the cathode and the cathode loading springs 52 are inserted in place at each insulator. The cathode is then spring loaded against the short spacer rods 46.

The remaining frame rod 30 may then be positioned between the insulators adjacent the rear of the anode 39, the heater element 64 positioned within the cathode 38, the getter assembly secured to the upper insulator 27, and the whole mount positioned on and properly electrically connected to the leads 17–25 extending through the base of the bulb 15.

In one specific illustrative embodiment of this invention as shown in Fig. 1, the spacing between the cathode 38 and the plane of the laterals 44 was 0.001 inch. Closer spacings are easily attainable and controllable within tight tolerance limits. I have found that by positioning the electrodes in accordance with my invention, accurate close spacings can be obtained below 0.001 inch and that it is not the accuracy of the spacing but the lack of consistency in the pitch of the lateral wires 44 which restricts the closeness of the cathode to the control electrode that is desirable in a device.

The spacing between the control electrode and the anode surface 56 is dependent primarily upon the diameter of the rods 46 and also upon the accuracy of formation of the tabs 58. Thus, this interelectrode spacing may also be quite small. In specific embodiments of this invention that have been constructed, spacings of 0.003 and 0.006 inch have been easily and accurately attained. These close anode to control electrode spacings make it possible to operate devices in accordance with this invention at low anode voltages without overheating the anode at high current densities. Adequate cooling of the anode in this specific illustrative embodiment of the invention is attained by radiation, as the anode may be advantageously of a relatively heavy carbonized nickel with a large radiating surface.

It is to be noted that although this specific illustrative embodiment of this invention employs end insulators, they play no part in the interelectrode spacings. They serve only as a means of support for the structure in the envelope 15 and also aid in reducing leakage currents by physically shielding the elements from the getter flash.

By supporting or positioning the cathode at its coated surface, in accordance with this invention, thermal expansion of the cathode does not affect the interelectrode spacings between the cathode and the other elements, which are measured from the plane of the cathode surface itself. Similarly, by spring biasing the other electrodes so that each is positioned with respect to one reference surface or plane, in accordance with this invention, thermal expansion of the control electrode frame or anode perpendicular to the cathode surface will not result in an undesirable change in electrode spacings. Additionally, as the electrodes are not positively or permanently secured at their ends but are positioned relative to each other by being spring loaded as described above, free thermal expansion of the cathode, control electrode, and anode can occur in a direction parallel to the cathode surface, thereby obviating the possibility of buckling of the electrodes upon heating due to expansion thereof. Thus, the interelectrode spacings are substantially unaffected by thermal expansion of the electrodes in directions perpendicular or parallel to the plane of the cathode surface. I have found that only bowing or twisting of the parts can effect a change in spacings and that the degree of spacing change arising from these sources is negligible, even at the minute spacings involved.

The substantial freedom of the interelectrode spacings from thermal variations can be seen from the fact that in one specific embodiment of this invention constructed as shown at Fig. 1, I have found by capacitance variation measurements that upon instantaneous application of full heater voltage to the cathode heater element 64, there is an initial decrease in the control electrode-cathode spacing of about 30 millionths of an inch in about a few seconds. Following this initial decrease, the spacing returns part way to about 15 millionths of an inch when the temperatures have reached an equilibrium value.

Figure 5:
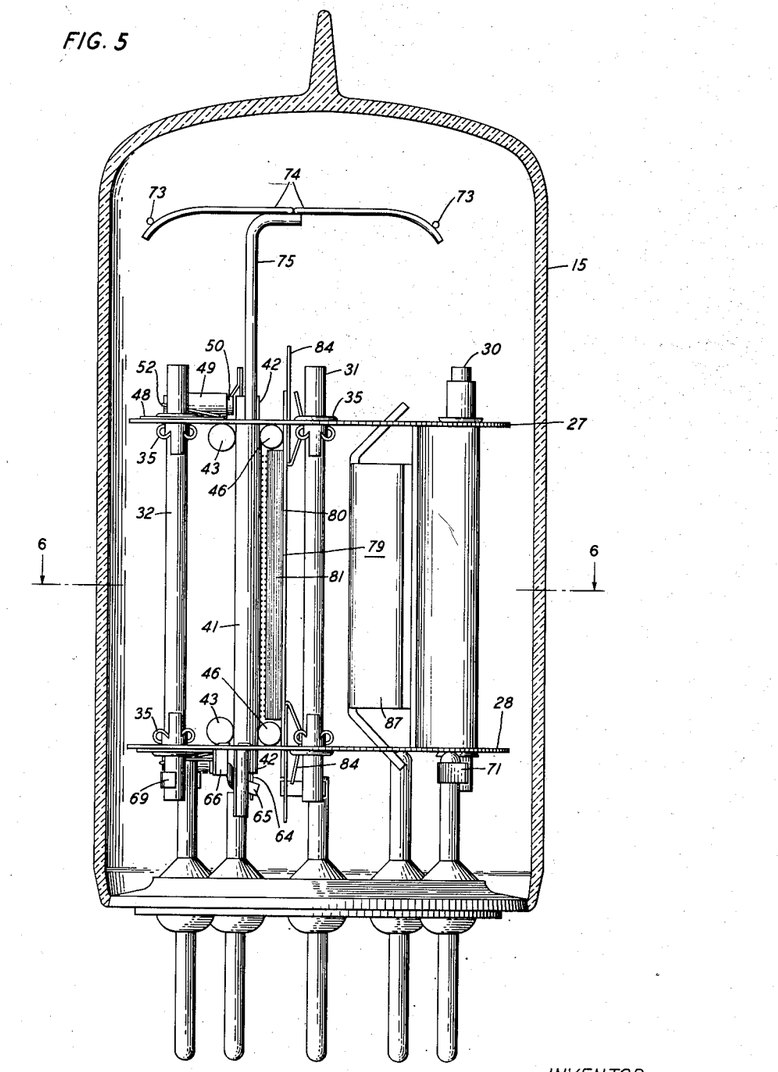
Fig. 5 is a side view of an electron discharge device illustrative of another specific embodiment of this invention, the envelope of the device being shown in section.

Referring now to Fig. 5, there is shown another illustrative embodiment of this invention, similar to that of Fig. 1, but wherein a screen electrode 79 is positioned between the control electrode and the anode. The same numerals have been employed to indicate parts identical with those of the embodiment of Fig. 1. Thus, the cathode 38 is spring loaded against the spacer rods 46 positioned by the stepped portions 42 on the control electrode side rods 41 by the plungers 50 and cathode loading springs 52.

Figure 6:
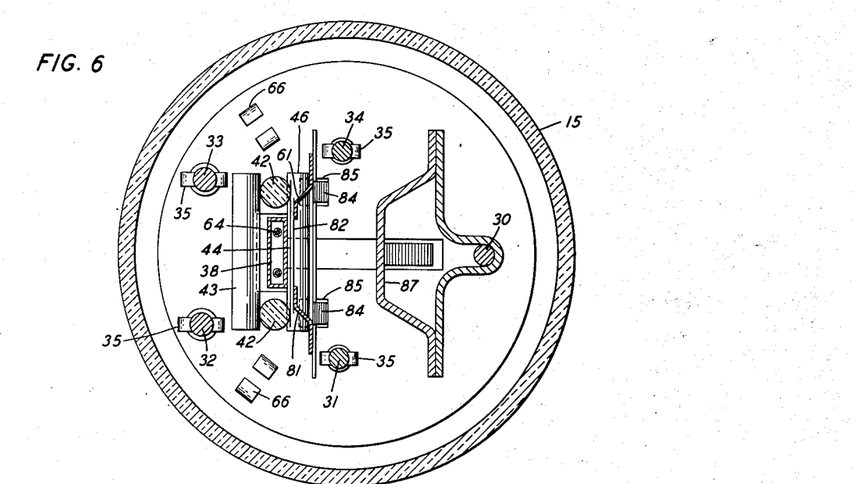
Fig. 6 is a sectional view of the device of Fig. 5 taken along the line 6—6 thereof.

The screen electrode 79 comprises a flat frame member 80 having inner bent portions 81 defining a window across which lateral wires 82 extend. The frame member 80 is spring loaded against the short ceramic rods 46 by four U-shaped spring members 84 extending through the end insulators 27 and 28 at each end of the frame member 80. Alternatively, the four U-shaped spring members 84 may be constructed as two unit members, each member consisting of two U-shaped spring portions extending from and being a part of a metal rectangular plate. The two springs of each unit member may then be inserted in place with ease, and the rectangular metal portion thereof becomes an electrical part of the screen grid frame contributing to the desirable electrostatic shielding between the anode and the control electrode. The spring members 84 have the flexed portion of the U bearing against one side of an aperture 85, best seen in Fig. 6, in the insulator and the other flat side bearing against the frame member 80 and biasing it towards the cathode.

The anode 87 is a flat member, as of nickel, positioned opposite the cathode 38 and supported by the frame rod 30 to which it is secured.

This invention is, of course, not limited to employment in structures wherein the electrodes are mounted between end insulators, as in the embodiments of Figs. 1 and 5. Thus, in the illustrative embodiments of this invention shown in Figs. 7 and 9, the electrodes are mounted by a single plate whereby a very rugged structure is attainable. Each of these illustrative embodiments is disclosed merely as an electrode assembly, it being understood that they would be suitably incorporated into evacuated envelopes. Further, the advantages of my novel electrode spacing and support means that are common to each of these specific embodiments, whereby very accurate interelectrode spacings are attained, as described above, are not repeated, it being understood that the prior description and discussion is equally applicable to the common features of the specific embodiments.

Figure 7:
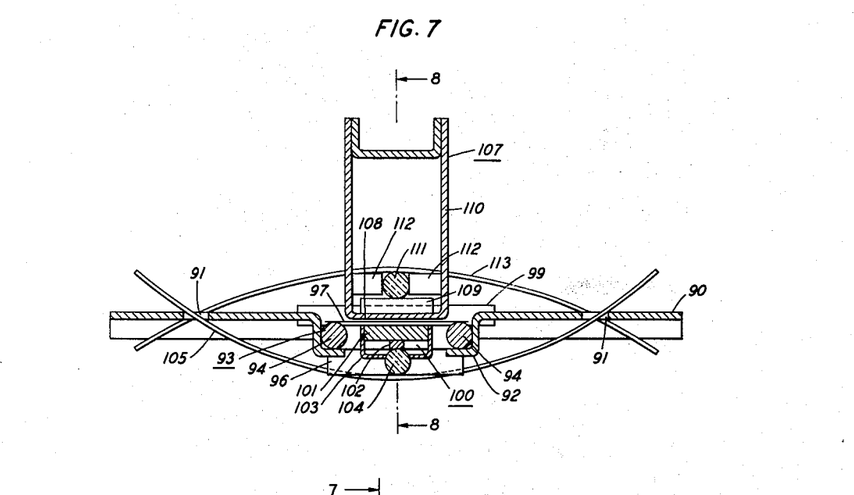
Fig. 7 is an end cross-sectional view of an electrode assembly illustrative of still another embodiment of this invention, the view being taken along the line 7—7 of Fig. 8.
Figure 8:
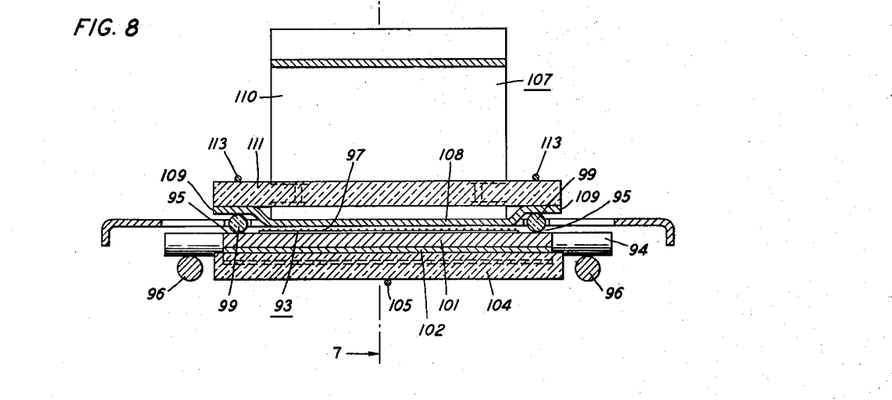
Fig. 8 is a side sectional view of the electrode assembly of Fig. 7 taken along the line 8—8 thereof.

Referring now to the specific illustrative embodiment of Figs. 7 and 8, all of the electrodes are supported by a single flat mounting plate 90 having apertures 91 therein and a central cradle portion 92. The side rods 94 of a control electrode 93 next in the cradle portion 92, the side rods 94 having stepped portions 95 at each end, as seen in Fig. 8. The height of the step between the stepped portions 95 and the central portions of the side rods 94 across which the lateral wires 97 extend is enlarged in Fig. 8 for reasons of clarity. The end rods 96 are secured to the back of the side rods 94 outside of the cradle portion 92, as clearly seen in Fig. 8, and complete the frame of the control electrode 93.

The insulating spacer rods 99 are positioned in slots in the mounting plate 90 on the stepped portions 95 of the side rods 94 and are spring loaded thereagainst, as described further below.

The cathode 100 is spring loaded against the spacer rods 99, the cathode 100 comprising a cathode blank 101 having an electron emissive coating on the surface adjacent the control electrode wires 97, a member 102 adjacent the back of the blank 101, and a channel support member 103 to which the cathode blank 101 is secured. An insulating cathode loading rod 104 extends partially through a slit along the length of the channel support member 103. The cathode loading spring wire 105 extends through two apertures 91 in the mounting plate 90 and bears against the rod 104, thereby biasing the cathode surface of the blank 101 against the spacer rods 99 positioned by the stepped portions 95 of the control electrode side rods 94.

The anode 107 comprises a flat surface portion 108 adjacent the control electrode wire laterals 97, integral tabs 109 bent back from the plane of the surface portion 108 and bearing on the spacer rods 99, and long integral side portions 110 extending from the surface portion 108 and providing a large dissipative surface area. An insulating anode loading rod 111 extends through the anode 107 and bears against the integral tabs 108 and is positioned against side movement by portions 112 bent in at each end of the anode 107. Two anode loading spring wires 113 extend through aperatures 91 in the mounting plate 90 and bear against the anode loading rod 111, spring biasing the spacer rods 99 against the stepped portions 95 of the side rods 94.

Figure 9:
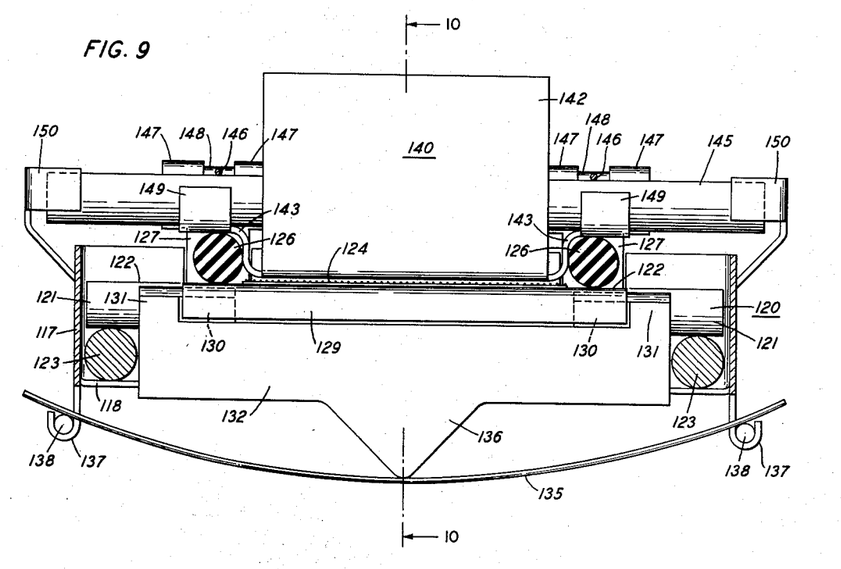
Fig. 9 is a side view of another electrode assembly illustrative of still another embodiment of this invention, the view being taken along the line 9—9 of Fig. 10.
Figure 10:
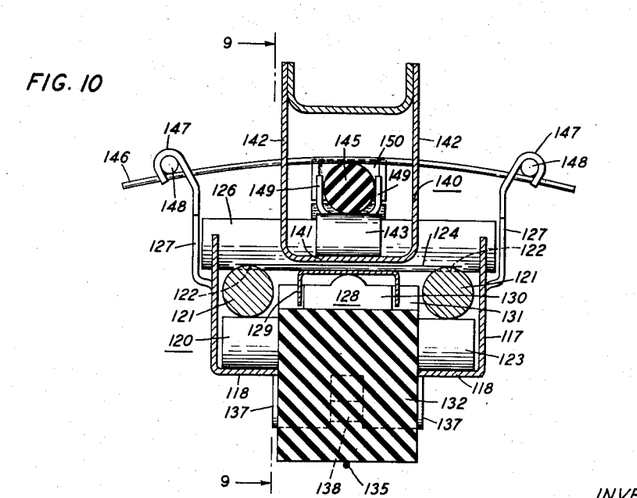
Fig. 10 is a sectional view of the electrode assembly of Fig. 9 taken along the line 10—10 thereof.

Referring now to Figs. 9 and 10, there is shown another illustrative embodiment of this invention wherein all the electrode elements are supported and positioned by a single mounting member without the employment of any welded joints. Only the electrode assembly itself is shown in the drawings, it being understood that it would be suitably positioned in an evacuated envelope and electrical connections made from the elements of the assembly to leads extending through the envelope.

The electrode assembly comprises a cradle 117 formed from a single piece of metal, as of nickel, with a wide slot in its base separating two flat base portions 118. Various portions of the cradle are bent to form cooperating parts, as explained in detail below. The control electrode 120 is similar to that of the other embodiments described above and comprises a pair of side rods 121 having stepped portions 122 at each end and end rods 123 secured to the side rods removed from the stepped portions. The control electrode 120 is positioned in the cradle 117, the end rods 123 extending between the base portions 118 of the cradle at each end thereof and extending across the wide slot in the base of the cradle. Wire laterals 124 extend between the two side rods 121 between the stepped portions thereof.

Insulating spacer rods 126 are spring biased against the stepped portions 122 of the side rods 121 and are positioned in slits in the sides of the cradle 117. They are held against possible side movement by the sides of the slit and against axial movement by integral tabs 127 bent away from the cradle 117 and extending upward to cooperate with the anode spring loading means, as explained further below.

The cathode assembly 128 comprises a thin cathode sheet 129, as of nickel, substantially of channel cross section and having an electron emissive coating on its outer surface. The cathode channel 129 is supported between the narrow portions 130 of projections 131 on an insulating cathode block 132. It is held against possible sidewise movement by the width of the narrow portions 130 fitting within the channel 129 and against possible lengthwise movement by the abutment of the projections 131 against the ends of the cathode channel 129. The block 132 itself fits through the wide slit in the base of the cradle 117 and is prevented from possible side movement by the base portions 118 of the cradle 117 and against possible lengthwise movement by the control electrode end rods 123 extending between the base portions 118 at the ends thereof.

The cathode assembly 128, and thus cathode channel 129, is spring biased against the spacer rods 126 by a cathode loading spring wire 135 bearing against a central nub 136 depending from the block 132 and tensioned by passing between two fingers 137 extending down from the ends of the cradle 117 at the center thereof, where it is held by pins 138.

The anode 140 comprises a surface portion 141 adjacent the control electrode wire laterals 124, long integral side portions 142 extending back therefrom, and integral tabs 143 bent back from the surface 141 and resting on the spacer rods 126. An insulating anode loading rod 145 extends through the anode 140 and bears against the tabs 142. Spring loading is provided by two loading spring wires 146 bearing against the rod 145 adjacent the spacer rods 126 and tensioned by passing between two fingers 147 integral with tabs 127, where they are held by pins 148. The anode tabs 142 have upward side portions 149 which prevent sidewise movement of the anode relative to the rod 145, which is itself prevented from either possible sidewise or lengthwise movement by another extension 150 integral with the cradle 117 and extending centrally upward from the end portions thereof.

The specific electrode assembly, in accordance with the illustrative embodiment of this invention just described, provides a compact structure in which any but the most minute motion of any of the parts is impossible. Considerable additional ruggedness is inherent in the assembly because of the absence of any mica, even for supporting the elements as well, of course, as for positioning them, and the omission of any welds or brazes in the assembly of the structure. Generally, the points at which such welds or brazes have been made are among the first to fail when such a device is subjected to excessive vibration or shock, as are electron discharge devices when being tested for some uses.

While in each of the illustrative embodiments of this invention described above the stepped portions have been on the side rods of the control electrodes, this invention is not to be considered so limited. Thus, the stepped portions may be on other members, such as in the spacer rods against which the cathode surface and other elements are spring loaded. In such an embodiment, the spacer rods could advantageously be "rolling pin" shaped, the control electrode side rods bearing against the smaller diameter portions of the pin and the cathode against the central larger diameter portion. Or the stepped portion may be in the cathode itself, both the spacer pin against which the cathode is positioned and the control electrode side rods being smooth.

Similarly, this invention may advantageously be employed in other illustrative embodiments wherein both sides of a cathode are utilized. However, I have found it preferable to employ my invention in embodiments wherein only one side of the cathode is utilized.

Reference is made of an application of E. J. Walsh, Serial No. 231,765, filed June 15, 1951, wherein a related invention is described.

It is to be understood that the above-described embodiments and arrangements are merely illustrative of the application of the principles of the invention. Numerous other arrangements may be made by those skilled in the art without departing from the spirit and scope of the invention.

What is claimed is:

1. An electron discharge device comprising a cathode having a surface, means positioning said cathode with reference to said surface, an electrode, and means accurately defining the separation between said cathode and said electrode, said last-mentioned means comprising a pair of parallel stepped members defining reference planes for said cathode surface and said electrode.

2. An electron discharge device comprising a cathode having a surface, an electrode having a plurality of lateral wires adjacent said cathode, and means accurately defining the separation between said cathode and said electrode wires comprising a stepped member defining reference planes for said cathode and electrode wires, said cathode being positioned in one of said reference planes by said cathode surface.

3. An electron discharge device comprising a cathode having a flat surface, an electrode having a plurality of lateral wires adjacent said cathode, means accurately defining the separation between said cathode and said electrode comprising a stepped member defining reference planes for said cathode surface and said electrode wires, and means spring biasing said cathode towards one of said reference planes and positioning said cathode in said plane.

4. An electron discharge device comprising an electrode having side members and a plurality of wires extending between said members, a cathode having a flat surface positioned between said members adjacent said wires, and a spacer member positioned against said cathode and said side members, one of said spacer members, side members, and cathode having a stepped portion therein defining reference planes for said cathode and said wires whereby the spacing between said cathode and said wires is determined by the depth of said stepped portion.

5. An electron discharge device comprising an electrode having side members and a plurality of lateral wires extending between said members and secured thereto, a cathode having a flat surface positioned between said members adjacent said wires, a spacer member contiguous to said side members, and spring means biasing said cathode surface against said spacer member, said spacer members, electrode side members, and cathode defining a pair of reference planes in one of which said cathode surface is positioned by said spring biasing means and in the other of which said lateral wires are positioned.

6. An electron discharge device comprising an electrode comprising a pair of side supports having stepped portions at the ends thereof, said side supports defining two reference planes thereby, a plurality of wires extending between said supports and secured thereto in one of said reference planes, a cathode having a flat surface between said side supports, spacing means extending across said stepped portions, and means positioning said cathode surface against said spacing means in the other of said reference planes.

7. An electron discharge device comprising an electrode having side supports having stepped portions at each end, a plurality of wire laterals extending between said side supports, a flat cathode adjacent said laterals and between said side supports, a spacer member positioned against said stepped portions, and means spring loading said cathode against said spacer member whereby the spacing between said cathode and said laterals is determined by the depth of said stepped portions.

8. An electron discharge device comprising an electrode having a pair of side members having stepped portions at each end, a plurality of wire laterals extending between said side members and secured thereto, a flat cathode adjacent said laterals between said side members, a spacer rod spring biased against said stepped portions at each end of said side members, and means spring loading said cathode against said spacer rods whereby the spacing between said cathode and said laterals is determined by the depth of said stepped portions.

9. An electron discharge device comprising an electrode having a pair of side rods having stepped portions at each end, and a plurality of wire laterals extending between said side rods and secured thereto, a flat hollow cathode between said side rods and adjacent said wire laterals, a spacer rod against said stepped portions at each end of said side rods, an anode having tabs adjacent said spacer rods, means spring loading said anode tabs and said spacer rods against said stepped portions, and means spring loading said cathode against said spacer rods.

10. An electron discharge device in accordance with claim 9 wherein said anode spring loading means comprises an anode loading rod extending adjacent said anode and bearing against the back of said anode tabs and a spring wire flexed to bear against said anode loading rod at each end thereof.

11. An electron discharge device comprising a pair of insulator members, a plurality of frame rods extending between said insulator members, said members having a plurality of apertures therein, a control electrode having side rods extending through said apertures and a plurality of wire laterals extending across said side rods and secured thereto, a flat cathode between said side rods and adjacent said wire laterals, means accurately defining the spacing between said cathode surface and said wire laterals comprising a stepped member defining planes for said cathode surface and said wire laterals, and spring means positioning said cathode surface against said first-mentioned means and in one of said reference planes, said spring means comprising a plate secured to the outer side of each insulator member, said plate having a central channel therein, a plunger extending through said channel and having one end bearing against said cathode and having a slit in the other end, and a spring wire flexed by two of said frame rods in said slit.

12. An electron discharge device comprising a pair of insulator members, a plurality of frame rods extending between said insulator members and defining a frame therewith, said members having a plurality of apertures therein, a control electrode having side rods extending through said apertures, said side rods having stepped portions on one side at each end, end rods secured to said side rods at the other side thereof, and wire laterals extending between and secured to said side rods on said one side, a flat hollow rectangular cathode between said side rods and between said end rods and said wire laterals, said cathode extending through apertures in said end plates, spacing rods against said stepped portions at each end of said side rods, an anode opposite said control electrode to the other side than said cathode, and means spring loading said cathode against said stepped portions.

13. An electron discharge device in accordance with claim 12 wherein said anode has a flat portion opposite said laterals and tabs against said spacer rods, and comprising an anode loading rod extending along the back of said anode and against said tabs and a spring wire on the outer side of each end insulator flexed by two of said frame rods and spring loading said anode loading rod, said anode tabs, and said spacer rods against said stepped portions.

14. An electron discharge device in accordance with claim 12 wherein said spring loading means comprises a plate secured to the outer side of each insulator member, said plate having a central channel therein, a plunger extending through said channel having one end bearing against the end of said cathode and having a slit in the other end, and a spring wire flexed by two of said frame rods in said slit and biasing said cathode against said spacer rods.

15. An electron discharge device comprising a first electrode having side rods having stepped portions at each end and a plurality of wire laterals extending between said side rods and secured thereto, a spacer rod against said stepped portions at each end of said side rods, a second electrode having portions bearing against said spacer rods, spring means biasing said second electrode against said spacer rods and said spacer rods against said stepped portions, a cathode between said side rods and adjacent said wire laterals, and means spring loading said cathode against said spacer rods whereby the spacing between said cathode and said wire laterals is determined by the depth of said stepped portions.

16. An electron discharge device comprising a pair of insulator members having apertures therein, a plurality of frame rods extending between said plates, a control electrode comprising a pair of side rods extending through said plates and having stepped portions at each end, a pair of end rods secured to and extending between said side rods adjacent the inner side of said end plates, and a plurality of wire laterals extending between and secured to said side rods, a spacer rod against said stepped portions at each end adjacent the inner side of said end plates, a screen electrode comprising a frame having central portions bent towards said control electrode, a plurality of wire laterals extending across said central portions, said frame being against said spacer rods, a first spring means biasing said frame against said spacer rods and said spacer rods against said stepped portions, an anode opposite said screen electrode away from said control electrode, said anode being supported by one of said frame rods, a flat cathode between said side rods and adjacent said control electrode wire laterals, and a second spring means biasing said cathode against said spacer rods.

17. An electron discharge device in accordance with claim 16 wherein said second spring means includes a plate secured to the outer surface of each insulator member and having a channel centrally therein, a plunger extending through said channel and having its one end bearing against said cathode and having a slit in its other end, and a spring wire flexed by two of said frame rods and in said slit.

18. An electron discharge device comprising a mounting member, an electrode supported by said member, said electrode comprising a pair of side rods having stepped portions at each end and lateral wires extending between and secured to said side rods, spacer means against said stepped portions, a first spring means biasing said spacer means towards said stepped portions, a cathode between said side rods and adjacent said wire laterals, and a second spring means biasing said cathode against said spacer means whereby the spacing between said cathode and said electrode lateral wires is determined by said stepped portions.

19. An electron discharge device comprising a mounting member, an electrode supported by said member and comprising a pair of side rods and wire laterals extending between said side rods and secured thereto, a cathode between said side rods and adjacent said wire laterals, spacer means defining the spacing between said cathode and said wire laterals, said spacer means comprising a member having a stepped portion, and means spring biasing said cathode, electrode, and spacer means together, said spring means being supported by said mounting member.

20. An electron discharge device comprising a mounting member, an electrode having a plurality of wire laterals, a cathode having a flat surface adjacent said wire laterals, means accurately defining the spacing between said cathode and said electrode wire laterals comprising a stepped member defining reference planes for said cathode and said electrode wire laterals, said cathode being positioned in one of said reference planes by said cathode surface, said means mounting said cathode, electrode, and spacing means from said member.

21. An electron discharge device comprising a mounting member having a channel portion, an electrode positioned in said portion, said electrode comprising side rods and a plurality of wire laterals extending across said side rods, a flat cathode adjacent said wires and between said side rods, means accurately defining the separation between said cathode and said wire laterals comprising a stepped member defining reference planes for said cathode and said wire laterals, spring means supported by said mounting member biasing said cathode towards one of said reference planes and positioning said cathode in said plane, an anode, and spring means supported by said mounting member biasing said anode towards said spacing means.

22. An electron discharge device comprising a flat mounting member having a channel portion therein, an electrode positioned in said portion, said electrode comprising side rods having stepped portions at each end and a plurality of wire laterals extending between said side rods and secured thereto, a spacer rod across said stepped portions at each end of said side rods, a flat hollow cathode adjacent said wires and between said side rods, a spring wire flexed and supported by said mounting member biasing said cathode against said spacer rods, an anode having a flat surface portion extending into said channel portion adjacent said wires and tabs bearing against said spacer rods, and a spring wire flexed and supported by said mounting member biasing said anode tabs against said spacer rods and said spacer rods against said stepped portions.

23. An electron discharge device comprising a cradle member having a slit in the base thereof, an electrode supported in said member, said electrode comprising a pair of side supports and a plurality of wire laterals extending between said supports and secured thereto, a cathode block extending through said slit, a cathode mounted by said block between said side supports and adjacent said laterals, means accurately defining the separation between said cathode and said electrode, said means comprising a stepped member defining reference planes for said cathode and said electrode wire laterals, and spring means biasing said cathode block and said cathode towards one of said reference planes and positioning said cathode in said plane.

24. An electron discharge device comprising a cradle member having a slit in the base thereof, an electrode supported in said cradle member, said electrode comprising a pair of side supports having stepped portions at each end and a plurality of wire laterals extending between said supports and secured thereto, a spacer rod extending across said stepped portions, a cathode block extending through said slit into said cradle member, a cathode supported by said cathode block between said side supports and adjacent said wire laterals, spring means biasing said cathode against said spacer rods whereby the spacing between said cathode and said wire laterals is defined by the depth of said stepped portions, an anode, and spring means biasing said anode against said spacer rods and said spacer rods against said stepped portions.

25. An electron discharge device comprising a cradle member, said cradle member having a slit in its base, an electrode positioned on said base closely adajcent the sides of said cradle member, said electrode comprising a pair of side rods, a pair of end rods extending therebetween, and a plurality of wire laterals extending between said side rods and secured thereto, spacer rods extending across said side rods, means integral with said cradle preventing motion of said spacer rods, a cathode block extending through said slit, a cathode channel supported by said block, said block being closely adjacent said end rods and said cathode channel being between said side rods and adjacent said wire laterals, spring means supported by said cradle member biasing said cathode channel against said spacer rods, an anode having a surface adjacent said wire laterals and tab portions resting on said spacer rods, means preventing motion of said anode, said means including integral extensions of said cradle member, and spring means supported by said cradle member and cooperating with said last-mentioned means to bias said anode tab portions against said spacer rods and said spacer rods against said side rods.

26. An electron discharge device comprising a cradle member having a slit in the base thereof and integral extensions extending therefrom, an electrode positioned in said member and comprising side rods, end rods, and wire laterals extending between said side rods and secured thereto, said side rods having ends closely adjacent the ends of said cradle member and said end rods having ends closely adjacent the sides of said cradle member, a cathode block extending through said slit closely adjacent said end rods, a flat cathode channel member supported by said block for minimum movement relative thereto, spacer rods extending across said side rods, and held by certain of said integral extensions, an anode having a surface opposite said wire laterals and tabs bearing against said spacer rods, said tabs having fingers extending therefrom, an anode loading rod extending through said fingers and engaging two of said integral extensions of said cradle member, a spring wire flexed by two other of said integral extensions and bearing against said anode loading rod adjacent each spacer rod, and a spring wire flexed by two other of said integral extensions and bearing against said cathode block, whereby said anode, cathode, and electrode are all spring biased together and positioned substantially immovably in said cradle member.

CHARLES T. GODDARD.

References Cited in the file of this patent

UNITED STATES PATENTS

| Number | Name | Date |
|---|---|---|
| 2,377,334 | Feindel | June 5, 1945 |
| 2,460,484 | Best et al. | Feb. 1, 1949 |
| 2,576,251 | Cisne | Nov. 27, 1951 |